Oct. 22, 1940.　　　　　　A. MERKLE　　　　　　2,218,585
MEANS FOR AND METHOD OF CLOSING AND SEALING
THE FILLER OPENING OF CONTAINERS
Filed April 7, 1938　　　　6 Sheets-Sheet 1

INVENTOR
*Alfred Merkle*
BY
*John O. Seifert*
ATTORNEY

Fig. 5.

INVENTOR
Alfred Merkle
BY John O. Seifert
ATTORNEY

Patented Oct. 22, 1940

2,218,585

UNITED STATES PATENT OFFICE 2,218,585

MEANS FOR AND METHOD OF CLOSING AND SEALING THE FILLER OPENING OF CONTAINERS

Alfred Merkle, East Northport, N. Y., assignor to American Sealcone Corporation, New York, N. Y., a corporation of New York Application April 7, 1938, Serial No. 200,725

25 Claims. (Cl. 93—6)

This invention relates to the closing and sealing of the filler opening of containers having a body of flexible fibrous material with a closure secured in one end and the opposite end, constituting the filler opening of the container, closed by pressing together opposite wall portions and secured in said condition, and relates particularly to the closing and sealing of the filler opening of such containers having a coating on the inner surface of a flexible thermoplastic material which is impervious to oil and grease and/or moisture-proof and having the properties of solidifying and being non-tacky at ordinary atmospheric temperatures and adapted to be fused and rendered tacky when subjected to an elevated temperature.

It is the principle object of the invention to provide an improved method of and means for closing and sealing the filler opening of containers of this character by bringing together opposite wall portions at the filler opening and securing the closure parts in closing condition by the coating material and to arrange the closure parts to liquid seal the same and reinforce and add rigidity to the container.

It is another object of the invention to provide an improved method of and means for closing and sealing the filler opening of containers of this character by pressing together opposite wall portions at the filler opening of the container to close the same and while holding the container with the filler opening in closed condition within the filler end of the container in successive sequence subject the closure parts to an elevated temperature to fuse and render the coating material on the contacting surfaces tacky and adhesively secure the closure parts in closed condition, and then fold the closure parts upon themselves and subject the folded closure parts to pressure and effect intimate contact between the closure parts during the cooling of the fused coating material.

It is another object of the invention to provide an improved method of and means to close and seal the filler opening of containers of this character operative in successive sequence to press together opposite wall portions of the container at the filler opening and arrange the closure parts to arcuate form in a direction transversely of the container body, then fuse and secure the closure parts by the coating material, and then fold the closure parts upon themselves in a direction toward the concave side of the closure parts and subject the folded closure parts to pressure to intimately contact the folded closure parts and reinforce the container body.

Containers of this character are made of a relatively thin fibrous material and as the pressed together parts of the container at the filler end are of multiple ply should the closure parts be folded upon themselves at an acute angle the material of the outer ply is subjected to tensile and bending stresses during the folding, and as the folded portions are subjected to pressure to effect intimate contact between the folded closure parts there is a possibility of the outer ply of the fold cracking and being broken with the result that the filler opening is not sealed in closed condition.

It is a further object of the invention to provide an improved method of and means to overcome said disadvantage by longitudinally creasing and laterally offsetting an intermediate portion of the closure parts and then fold the closure parts on the creased portion to the side to which the material of the crease is offset and displacing the creased material of the outer ply and thereby prevent transmitting tensile and bending stresses to the material of the outer ply of the fold and drawing the same in taut condition about the inner ply of the folded portion, and then applying pressure to and effecting intimate contact between the folded closure parts without any possibility of cracking or breaking the closure parts.

Other objects and advantages of the invention will hereinafter appear.

In the drawings accompanying and forming a part of this application

Figure 11ª is a sectional view taken substantially on the line 11ª—11ª of Figure 6 looking in the direction of the arrows.

In the embodiment of the apparatus for carrying out the invention illustrated in the drawings there is provided a supporting framework for the operative parts comprising a plate P arranged with a series of laterally extending lugs 20, shown as three in number, spaced about the plate, whereby the plate is mounted and supported on standards S. A second plate P′ is supported in superposed spaced and alined relation to the plate P by posts 21 fixed in and extending laterally from the plate lugs 20 and extended through openings in lugs 22 extended laterally from the plate P′ and the plate supported in superposed spaced relation to plate P upon sleeves 23 engaged on and through which the posts 21 extend. A spider member consisting of a hub with three arms 24, 24′ and 24″ extending radially therefrom is supported in superposed alined spaced relation to the plate P′ upon sleeves 25 engaged upon portions of the posts 21 extended above the plate P′, the posts extending through openings in the spider arms and said arms resting upon the sleeve 25 and secured thereon by nuts threaded onto the ends of the posts extended through the opening in the spider arms, as at 25′.

The operative parts of the apparatus are actuated by an electric motor mounted on the plate P, and shown in a conventional manner at M, the motor being connected through a suitable speed reducing gearing, shown in a conventional manner at G, with the driven shaft 26 thereof rotating on a vertical axis and has a pinion 27 fixed thereon. The pinion 27 meshes with a gear 28 rotatably carried by a bracket P″. The gear 28 meshes with a gear 29 fixed on a portion of reduced diameter of a shaft 30 journaled to rotate in a bearing in a hub centrally of the plate P′, as shown at 30ª in Figure 4, and supported on said hub by the shoulder formed by the portion of reduced diameter of the shaft engaging upon an anti-friction bearing 30ᵇ. The gear 28 also meshes with a pinion 31 fixed on a stud shaft journaled in a part 32 of the bracket P″, and a gear 33 rotatable with the pinion 31 meshes with a gear 34 (Figure 5) rotatable with a container carrier of container filler apparatus shown in the form of a table T, to transport containers the filler opening of which is to be closed and sealed from the container filling apparatus (not shown) and transferred from said table to means to close and seal the filler opening of the same. A bevel gear 35 rotatable with the gear 28 meshes with a bevel pinion 36 fixed on a shaft 37 journaled in the bracket P″, said shaft having a pulley 38 fixed thereon for supporting a conveyor belt 39 laterally of the plate P′ and adapted to receive containers the filler opening of which have been closed and transport them from the container closing and sealing means. The upper end of the shaft 30 is also reduced in diameter and is journaled in the spider hub, as shown at 30ᶜ in Figure 4, and to prevent upward movement of shaft 30 an anti-friction thrust bearing 30ᵈ is interposed between the spider and the shoulder formed by the portion of reduced diameter of the shaft 30.

Figures 2, 3:
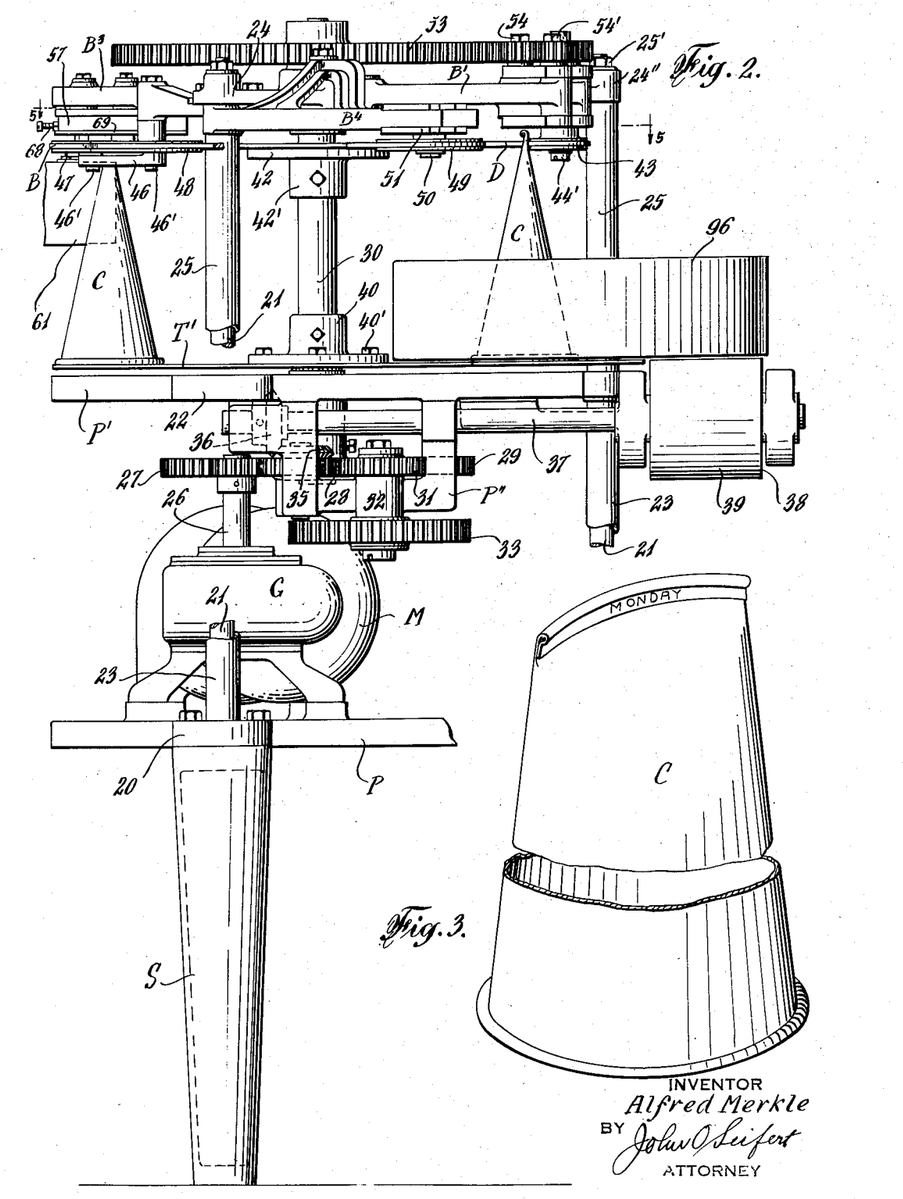
Figure 2 is a side elevation, partly broken away, of the apparatus looking at the bottom of Figure 1.
Figure 3 is a perspective view of a container the filler opening of which is adapted to be closed and sealed and showing the filler opening in closed and sealed condition.

Containers the filler opening of which is to be closed and sealed comprise a tubular body C of flexible fibrous material, such as paper, with a closure member secured in one end. The opposite end, constituting the filler opening, is substantially of elliptical form, the body of the container being performed in making the container so that the opposite wall portions converge from the bottom end to the filler end arranging the filler opening of less width than length, as shown at C′ in Figure 5. The container has a coating on the entire interior surface, or only on the seam parts thereof, of thermoplastic adhesive material which is impervious to oil and grease and/or moisture proof, and has the properties of solidifying to substantially flexible and non-tacky state at normal atmospheric temperatures and adapted to be fused and rendered tacky when subjected to an elevated temperature. The filler opening is closed by pressing together opposite wall portions at the filler end of the container and securing the same in said condition. The container C as shown in Figure 3 has a body of conical form with the bottom closure secured in the end of larger diameter and the filler opening in the end of smaller diameter, although the invention is applicable for closing and sealing the filler opening of containers of this character wherein the body is of uniform diameter for the entire length thereof, or of other cross sectional shapes where opposite wall portions at the filler opening are brought together to close the same. The arranging of the closed filler end to arcuate form transversely of the container reinforces it and adds rigidity to the container, particularly at the filler end.

Figures 1, 19:
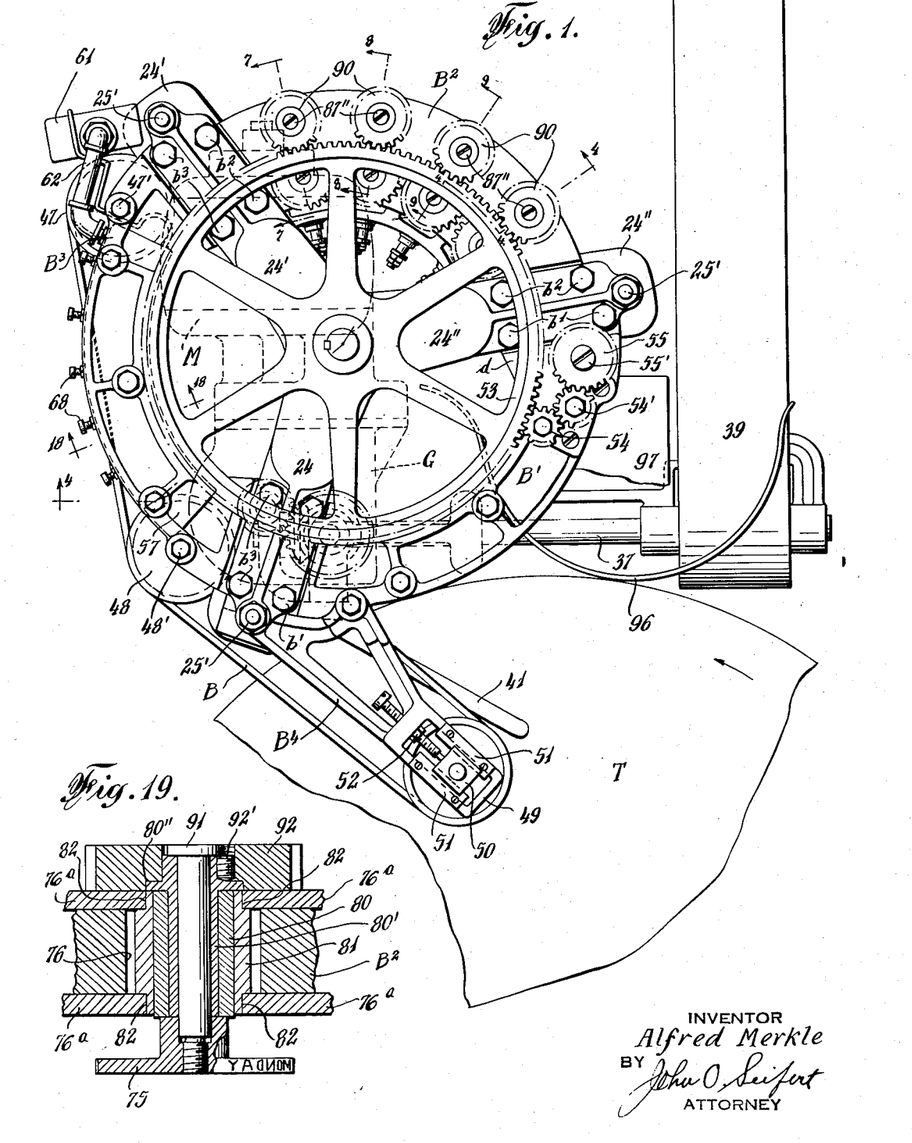
Figure 1 is a plan view of apparatus for carrying out the invention.
Figure 19 is a sectional view, on an enlarged scale, taken substantially on the line 19—19 of Figure 6 looking in the direction of the arrows to show the construction and arrangement of the adjustable means to mount an impression making roller and one of pairs of pressure rollers to vary the pressure and adapted the same to close and seal the filler opening of containers made of different thicknesses of material.
Figure 5:
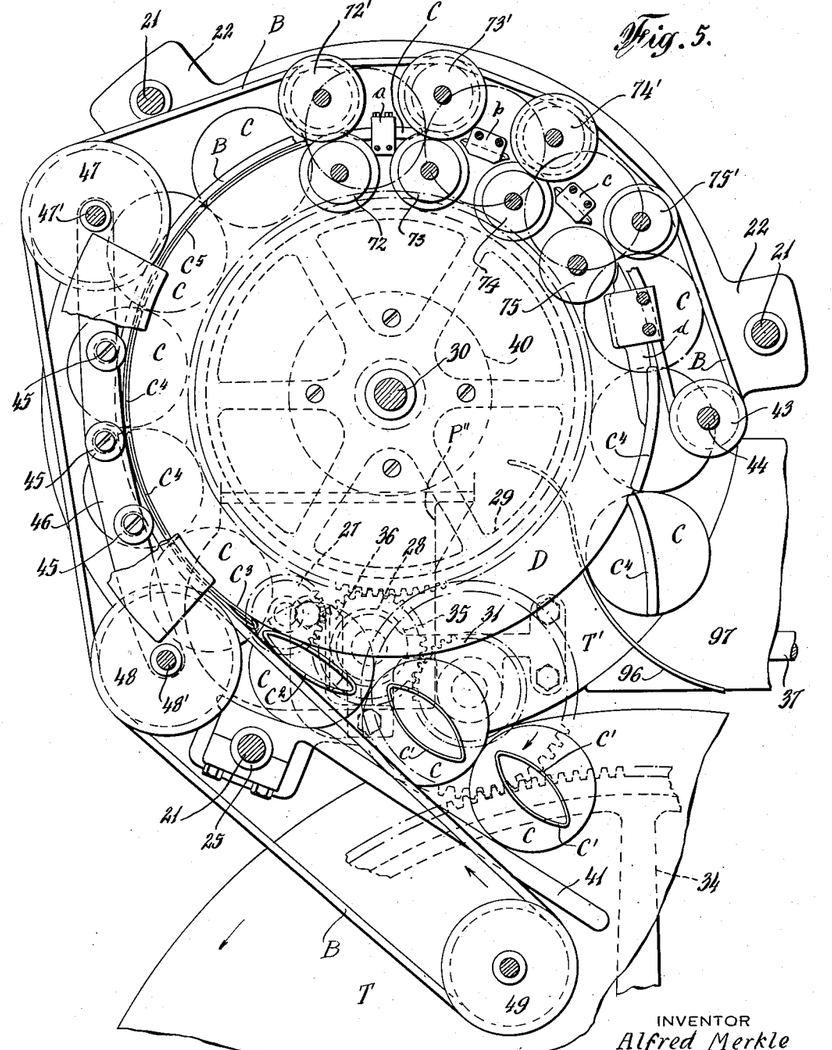
Figure 5 is a sectional view taken substantially on the line 5—5 of Figure 2 looking in the direction of the arrows and showing the means to press together opposite wall portions of a container to close the filler opening of the container and retain it in closed condition during the folding and sealing of the closure parts.

The containers the filler opening of which is to be closed and sealed are transported upon a continuously travelling conveyor, shown as a turntable T' fixed concentrically on the shaft 30 above the plate P', and shown as fixed to the flange of a hub 40 fixed on the shaft 30, as at 40'. The table T' is substantially of the same diameter as the plate P' and rotates in the plane of the table T and from which table the containers are transferred by the rotation thereof in the direction of the arrow to the table T' by the containers engaging a deflector and guiding member 41 mounted and fixed on a sleeve 25 on a post 21 to intersect the path of travel of containers on the table T, as shown in Figures 1 and 5. As the containers are transferred from table T to table T' a side of the containers below the filler end is engaged with the periphery of a disk D of less diameter than the table T' mounted on the shaft 30 to rotate therewith by fixing the same by screws 42 to the flange of a hub 42' fixed on the shaft. The disk D is spaced from the conveyor or turntable T' a distance less than the length of the containers. As the containers are transferred to the turntable T' and engage the periphery of the disk due to the arrangement of performing the container body, as shown at C² in Figure 5, they are adjusted about their axis upon the table to position with the filler end of the container to engage in the bite between the periphery of the disk and a flexible member such as a belt or chain, shown as an endless belt B with a stretch of the belt engaging with and travelling relative to a peripheral portion of the disk, the disk rotating and the belt travelling in the direction indicated by the arrow, and said stretch of the belt caused to firmly engage the periphery of the disk by passing the same about a grooved wheel 43 (Figure 5) secured on a stud shaft 44 by a headed screw 44' (Figure 2), the stud being rotatable in a bracket B' fixed at the opposite ends as by screws or bolts b¹, to and extending between the spider arms 24, 24'', as shown in Figure 1. The inner and outer stretches of the belt are guided to and from the wheel 44 by passing it about grooved wheels, hereinafter described, mounted on a bracket B² fixed, as by screws or bolts b², at the opposite ends to and extending between the spider arms 24', 24''. From the wheel 43 the outer stretch of the belt passes about grooved wheels 47, 48 rotatable on studs 47', 48' fixed in and supporting the wheels below a bracket B³, said bracket being fixed by screws or bolts b³ at the opposite ends to and extending between the spider arms 24, 24'. From the wheel 48 the belt passes about a grooved wheel 49 rotatable on a stud fixed in a bearing box, as shown at 50 in Figure 1, slidably mounted at the opposite sides on gibs arranged at opposite sides of an opening in a bracket B⁴, as at 51, the bracket being fixed on the spider arm 24 to extend laterally therefrom. The bearing box 50 and thereby the wheel 49 is adjustable to take up slack in the belt, by a screw threaded into the bracket B⁴ engaging the inner end of the bearing box 50 and retained in adjusted position by a lock nut, as at 52. The belt is positively driven from the shaft 30 to cause the belt to travel in synchronism with the rotation of the disk D and turntable T' by a gear 53 fixed on the shaft 30 above the spider arm to rotate with the shaft meshing with a pinion 54 rotatably carried on the bracket B', said pinion meshing with an idler pinion 54' also rotatably carried by the bracket B' and meshing with a gear 55 secured by a screw 55' on the stud 44 carrying the wheel 43.

A container transported by the conveyor or turntable T' is engaged at a point below the filler end by the disk D and the inner stretch of the belt B, as shown at the left in Figure 4, and as the container travels from the position C² to the position C³ the opposite wall portions at the filler end are progressively brought into contact, as shown at position C⁴, and clamped and held in intimate contact by the belt B engaging the periphery of the disk. Simultaneously with pressing opposite wall portions at the filler end into contact to close the same the closed end is shaped to arcuate form transversely of the container body conformably to the periphery of the disk D.

Figure 13:
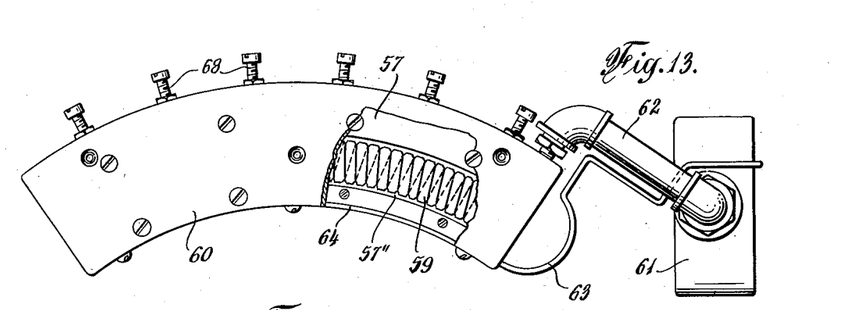
Figure 13 is a plan view of electric heating means to subject the closure parts to heat and pressure.

As a container travels from the position C³ to position C⁵ (Figure 5) the closed closure parts are subjected to an elevated temperature to fuse the coating material on the contacting surfaces and simultaneously subjected to pressure to adhesively unite the contacting surfaces of the closure parts. For this purpose there is provided a housing including an arcuate member 57 (Figures 4 and 13 to 17) arranged with a channel 57' in one face, said member being supported by screws 58 from the bracket B³ to extend below the same with the channel in the bottom. The one face 57'' of the inner side wall of the channel is of convex form extending coincidental with a peripheral portion of the disk D and with which face 57'' the one side of the closed end or closure parts of the container is caused to engage during the travel of the container with the turntable, as shown at the left in Figure 4. The member 57 is heated by suitable heating means, and shown as an electric heating element 59 (Figures 4 and 13 to 18) engaged in a recess in the outer face of the member 57 opposite the channel 57' and adjacent the channel wall with the convex face 57'' and retained therein by a flanged cover plate 60 secured by screws to the member 57, as shown in Figure 13.

To control and regulate the temperature to which the member 57 is heated a switch is interposed in the electric conductors connecting the heating element with a source of electric energy, and shown in a conventional manner as carried in a casing 61 connected to a conduit 62 carrying the electric current conductors connected to the heating element 59. The switch is adapted to be actuated by a temperature responsive member 63 engaged in a recess in the channel wall having the convex face 57'' opposite said face and retained therein by a plate 64 secured to the member 57 by screws 57'''.

Figures 14, 15, 16, 17, 18:
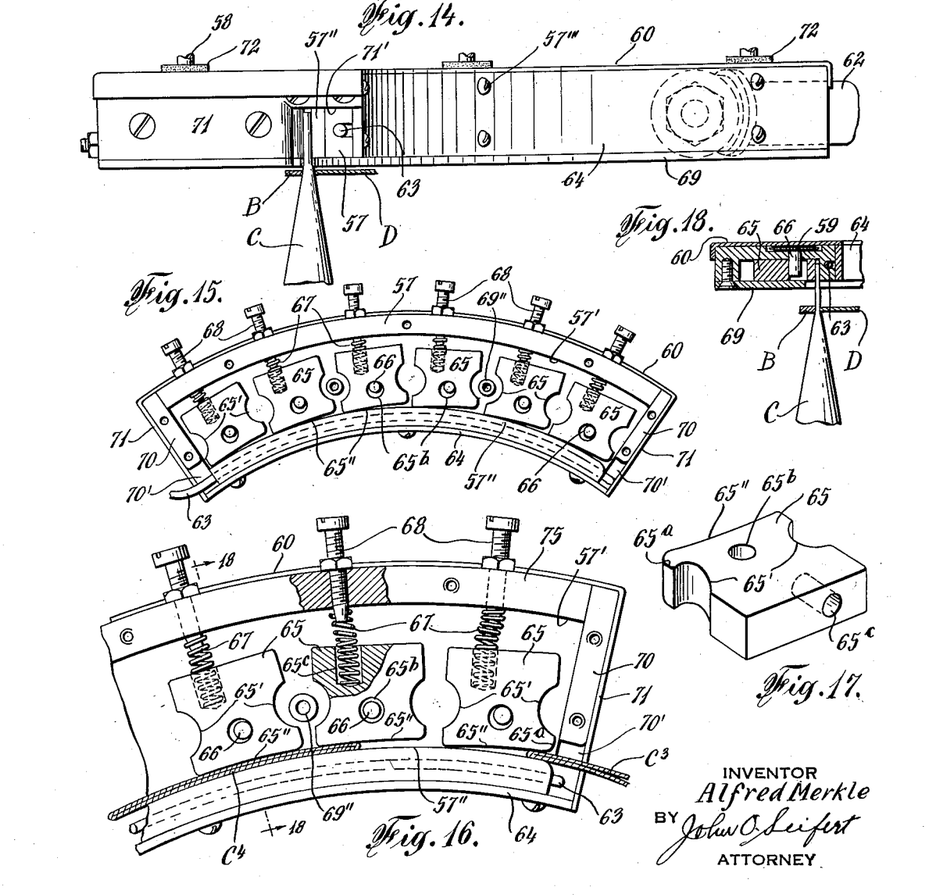
Figure 14 is an elevational view, on an enlarged scale, looking at the left of Figure 13.
Figure 15 is a view looking at the bottom of the heating and pressure applying means of Figure 13 with a cover plate removed to show the arrangement of the pressure applying means.
Figure 16 is a view of the right hand end portion of Figure 15, on an enlarged scale, to show the method of directing the closed filler end of the container to and subject the same to pressure during the heating of the same to fuse and render the coating material tacky.
Figure 17 is a perspective view of a member to apply pressure to the closed container end during the fusing and rendering the coating material tacky.
Figure 18 is a sectional view taken substantially on the line 18—18 of Figure 16 looking in the direction of the arrows and showing the filler end of the container held in closed condition while subjecting the same to heat and pressure.

To cause the closed filler end of the container to contact the face 57" of the member 57 and maintain the same under pressure means are provided to engage the closure parts opposite said face 57". This means comprises a series of shoes in the form of substantially rectangular blocks 65 arranged successively in the channel of the member 57. The front and rear edges are recessed, as at 65', and one edge, as 65" opposed to the arcuate face 57" is in an arc of a circle having a slightly greater radius than the radius of the face 57" and peripheral wall of the disk D, and said edge or face 65" merging in a rounded corner at the juncture of said face with the forward edge of the block, as at 65ᵃ. The shoes are mounted in the channel of the member 57 to have movement toward and away from the face 57" and to have rocking movement relative to said face. For this purpose each block is provided with a circular opening 65ᵇ arranged at one side of the longitudinal center nearer the arcuate face 65", and whose center is slightly to one side of the transverse center nearer the forward edge of the block. The openings 65ᵇ are adapted for the engagement of pins 66 fixed in and projecting from the bottom wall of the channel 57' in member 57 and of less diameter than the block openings 65ᵇ, whereby the blocks are adapted to have movement about and relative to said pins toward and away from the arcuate face 57" of the member 57. The shoes are caused to engage and yieldingly press against the closure parts of the container engaging the arcuate face 57" of the member 57, as shown at the left in Figure 16, and the shoes are urged to normally engage the following end portion of the arcuate face 65" with and cause said face to incline relative to the face 57" and permit of the ready passage of the pressed together closure parts of the container between said face 57" and the arcuate face 65" of the shoes, as shown at the right in said Figure 16 and in Figure 15. This is effected by springs 67 having one end seated in sockets 65ᶜ in the edge of the shoes opposite the face 65" and at one side of the transverse center and rearwardly of the opening 65ᵇ, as shown in Figure 16. The springs are retained in position in the sockets by the end of screws 68 engaging in the opposite end of the springs, the screws being threaded into openings in the channel wall of the member 57 opposite the face 57", and secured in adjusted position by lock nuts. By this arrangement of the shoes they are normally urged to the position shown in Figure 15 and at the right in Figure 16 with the rear or following portion of the face 65" of the shoes in engagement with the arcuate face 57" and the leading portion of said face of the shoes spaced from said face 57" by the contact of pin 66 with the shoe 65 at one side of the opening 65ᵇ. As the closure parts of a container passes from between a shoe and the face 57" the shoe assumes the position with the wall of the shoe opening 65ᵇ free of the pin 66, as shown by the center shoe in Figure 16, whereby all of the pressure of the spring will be exerted on the fold of the closed filler opening at the following end of the closure parts. The shoes are retained in the channel 57' by a plate 69 secured by screws passing through openings in the plate and through spacers 69" and are threaded into the member 57. The ends of the channel 57' are closed by members 70 of a length to terminate within the face 57" to provide a space 70' for the passage of the closed end of the container. Metal plates 71 are secured by screws to and enclose the end members 70, the flange of the plate 60 engaging over a marginal portion of said plates 71. The plates 71 have a cut away portion at the ends, as shown at 71' in Figure 14, for the passage of the closed filler end of the container between the face 57" and the leading shoe 65 and for the passage of the closed filler end from between the rearmost shoe and said face 57". The cover or closure plates 60, 64, 69 and 71 serve as a liquid tight enclosing housing for the parts and are preferably of a material that is a low conductor of heat and thus retain the heat in the heating member 57. To prevent dissipation of the heat from member 57 by transference thereof to the bracket B³, heat resisting material, such as asbestos, is interposed between the heating member 57 and said bracket, as shown at 57ᵃ in Figure 4, and the openings in said bracket through which the screws 58 are extended are of greater diameter than the screws and out of contact therewith, the screws 58 supporting the heating member from the bracket B³ by washers and a disk 58' of heat resisting material, such as asbestos, is interposed between the washer and bracket B³, as shown at the left in Figure 4.

To maintain the closure parts in closed condition during the travel thereof relative to the heating means the belt B is guided in the same plane with the periphery of the disk by a series of peripherally grooved rollers 45, shown as three in number, rotatably mounted on a bar 46 fixed at the opposite ends to the lower ends of the studs 47', 48' rotatably carrying the wheels 47, 48, as by screws 46'.

Figures 6, 7, 8, 9, 10, 11, 11A, 12:
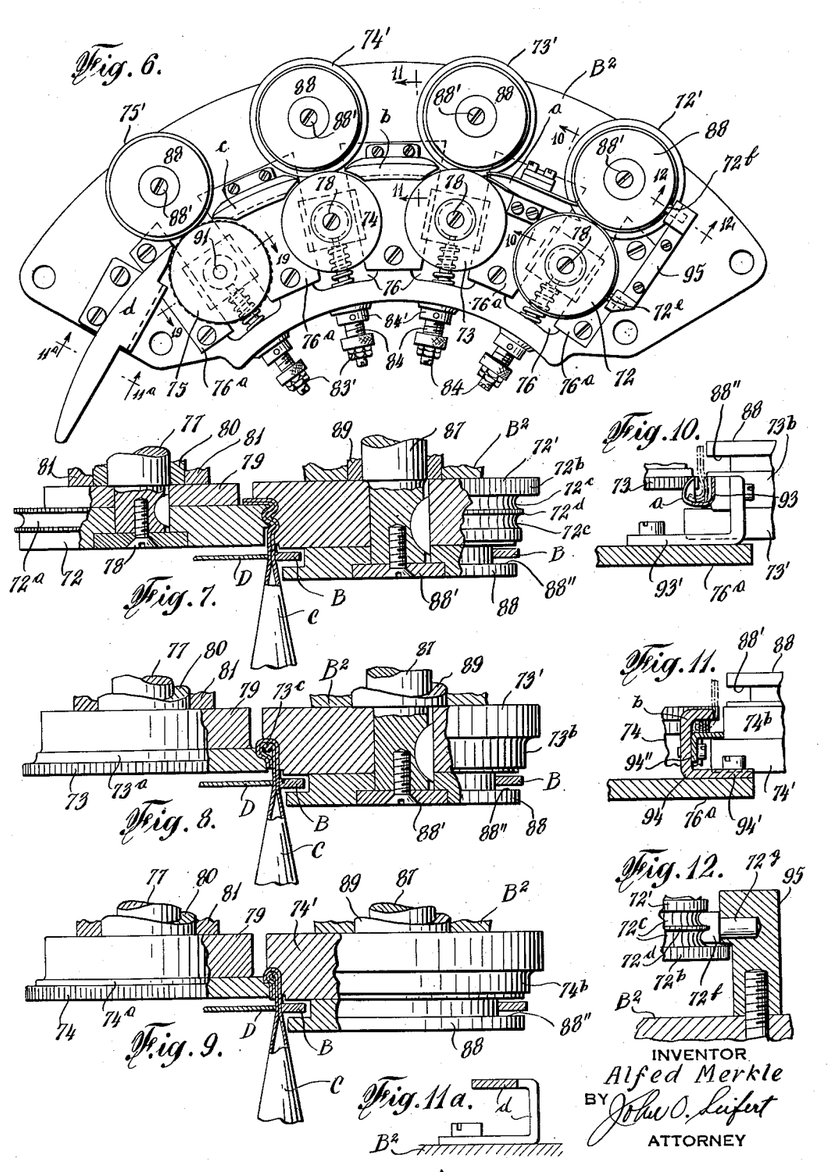
Figure 6 is a detail view looking at the bottom of the means to fold and press together the closure parts.
Figure 7 is a sectional detail view taken substantially on the line 7—7 of Figure 1 looking in the direction of the arrows and showing the means to arrange the closed parts with a crease intermediate thereof and primarily fold the same outwardly from the crease.
Figure 8 is a cross sectional detail view taken substantially on the line 8—8 of Figure 1 looking in the direction of the arrows and showing the means to fold the closure parts upon themselves.
Figure 9 is a sectional view taken substantially on the line 9—9 of Figure 1 looking in the direction of the arrows and showing the means to subject the folded closure parts to pressure.
Figure 10 is a detail view in section the section being taken substantially on the line 10—10 of Figure 6 looking in the direction of the arrows and showing the means to effect folding of the closure parts.
Figure 11 is a detail view in section the section being taken on the line 11—11 of Figure 6 looking in the direction of the arrows and showing means to hold the folded closure parts in folded position while moving from one pressure roller to another.
Figure 12 is a sectional detail view taken substantially on the line 12—12 of Figure 6 looking in the direction of the arrows and showing means in connection with the creasing and primary folding means to clear foreign substances therefrom.

After the closed filler end of the container has been subjected to the heating and pressure means, it is subjected in successive sequence to means to longitudinally flute or crease the closure parts intermediate thereof with the creased portion extending toward the concave side of the closure parts and bend the closure parts outwardly from the crease laterally toward the concave side of the closure parts, as shown in Figure 8, and then folded upon itself and firmly pressed together, and thereafter apply pressure to the folded closure parts inwardly from the fold or bend, as shown in Figure 9, and subject the same to means to impress or imprint indicia upon the folded portion outwardly from the fold, such as the day of the week, and shown as the word "Monday" to indicate the container was filled and sealed on such day. This means as shown comprises a series of pairs of rollers 72, 72'; 73, 73'; 74, 74', and 75, 75' mounted on the bracket B² to rotate on vertical axes. As the closure parts of the container travel relative to said pairs of rollers the closure parts are guided to and from the rollers by a series of devices, shown as four in number a, b, c and d, the device a being adapted to fold the closure parts upon themselves upon the crease and the other devices guiding and maintaining the closure parts in contact, said devices being shown in inverted position in Figure 6. The rollers 72, 73, 74 and 75 are mounted on gib plates 76ᵃ secured on the top and bottom of the bracket B² to extend in spaced relation transversely of an opening 76 in said bracket, the gib plates relative to the end walls of the opening being of less width than the intermediate plates, as shown in said Figure 6.

The rollers 72, 73 and 74 are mounted in a similar manner on the bracket B² and a description of the mounting of one of said rollers will suffice for all of said rollers and is described in connection with the mounting of roller 74, as shown at the right in Figure 4. The roller 74 is keyed to an end of reduced diameter of a shaft 77 and retained thereon by a disk engaging in an enlargement of the roller bore to abut the end of the shaft and secured therein by a screw, as at 78. A spacer 79 of less diameter than the roller is interposed between the roller and the shoulder formed by the portion of reduced diameter of the shaft. The shaft is rotatable in a bearing 80 in a rectangular block 81 having undercut portions in the top and bottom corners extending parallelly of the opposite sides, as at 82, in Figure 19 for the slidable engagement of the gib plates 76ª. Means are provided to adjust the blocks 81 and to retain them in adjusted position, comprising, as shown in Figure 4, a stem 83 having a screw threaded connection at one end with the blocks and the opposite end portion screw threaded and extended through a sleeve 84 threaded into a boss 84' extended laterally from the bracket B² with lock nuts 83' on the stem 83 abutting the end of the sleeve and thereby permitting of slidable adjustment of the block with the shaft in one direction and limit such movement in the opposite direction by the lock nuts engaging the end of the sleeve 84. The block with the shaft is urged to the limit of its movement in one direction by a spring 85 coiled about the stem 83 and confined between the block and boss 84'. The shaft 77 is provided with an annular enlargement 77' of a diameter to engage the end of and support the shaft upon the bearing 80 against downward movement. A pinion 86 is fixed on a portion of the shaft extending from the annular enlargement with such shaft enlargement engaging in an enlargement of the pinion bore and secured on the shaft by a disk engaged in a portion of enlarged diameter at the opposite end of the pinion bore and retained therein by a screw, as at 86'.

The roller 75 is mounted on the gib plates 76ª in a manner similar to the mounting of the rollers 72, 73 and 74 including the bushing 80 mounted in the block 81 slidably engaging the gib plates 76ª, and in addition thereto, as shown in Figure 19, a sleeve 80' is engaged in the bushing 80, said sleeve having an annular enlargement 80'' intermediate the ends abutting the end of the block 81, the roller 75 constituting a pressure and impression making roller or wheel having characters on the periphery, and shown as the word "Monday." The roller is operatively connected to the sleeve 80' by a headed screw 91 screw threaded into a hub of said roller abutting the ends of the sleeve 80'. A pinion 92 is mounted on the end of the sleeve 80' opposite the roller 75 with the annular enlargement of the sleeve engaging in an enlargement of the pinion bore and the pinion secured to the sleeve by a set screw 92'.

Figure 4:
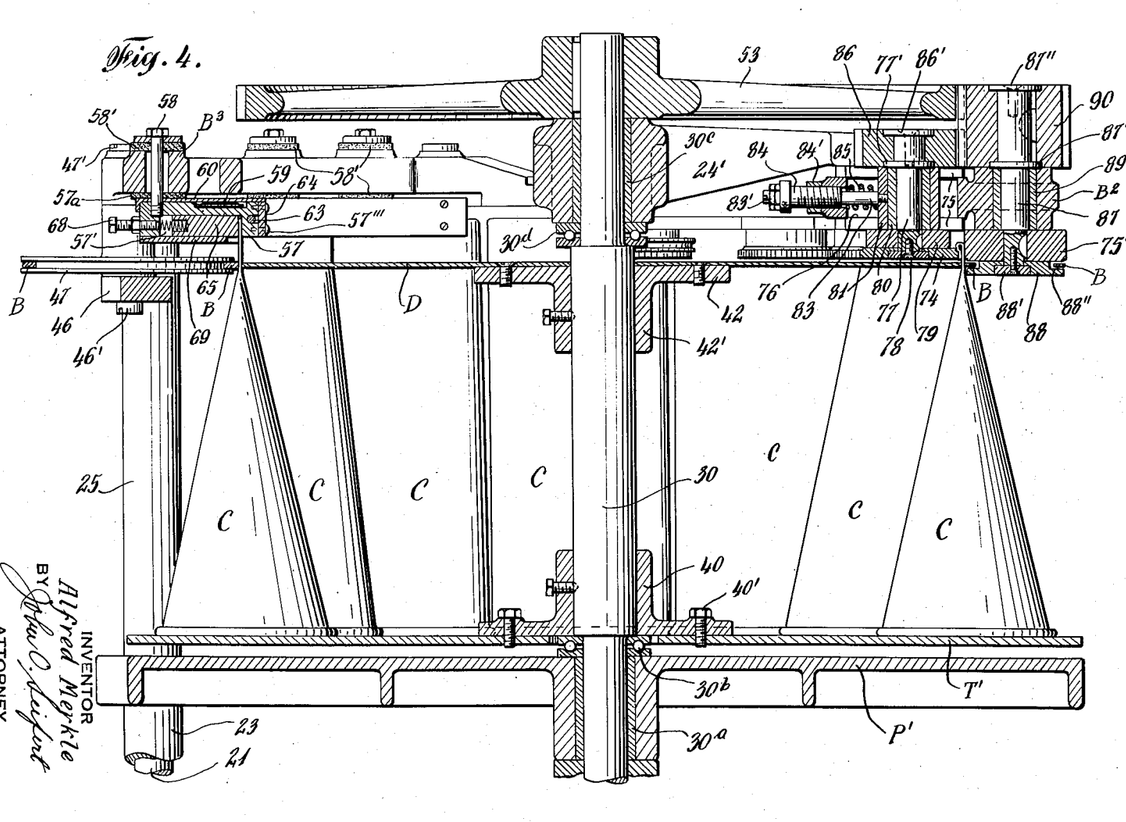
Figure 4 is a sectional view, on an enlarged scale, taken substantially on the line 4—4 of Figure 1 looking in the direction of the arrows and showing the parts to close and seal the filler opening of a container.

The mounting of the roller 72', 73' and 75' is the same as the mounting of the roller 74', shown in section at the right in Figure 4. The rollers are connected to the reduced end of a shaft 87 with a disk 88 engaged on the shaft at the outer side of the roller and secured thereon by a washer engaging an enlargement of the disk bore and a screw threaded into the end of the shaft, as at 88'. The disk 88 has a reduced peripheral portion in the side juxtaposed to the roller and in conjunction with the roller provides an annular recess for the engagement of both stretches of the belt B, as shown at 88''. The shaft 87 is rotatably mounted in a bushing 89 in a bore in the bracket B², there being such a bore for the shaft of each of the wheels 72', 73', 74' and 75', and the shaft has an annular enlargement 87' engaging and supporting the shaft against axial downward movement upon the bracket B². A gear 90 is keyed to each shaft 87 extending upwardly from the enlargement 87' with said enlargement engaging an enlargement in the bore of the gear 90 and the gear secured on the shaft by a washer engaging an enlargement in the opposite end of the bore of the gear and secured thereto by a screw, as at 87''. The gears 90 mesh with and are positively driven by the gear 53 keyed to the shaft 30, the gears 90 meshing with the pinions 86 and 92 to positively drive the rollers 72, 73, 74 and 75.

The first pair of rollers 72, 72' are arranged to bend the closure parts laterally in a direction toward the concave side of the closed container end and to crease or flute the closure parts longitudinally inwardly of the bend, as shown in Figure 7. For this purpose the roller 72 is arranged with a peripheral recess 72ª of arcuate form in cross section, the recess being arranged in a portion of increased diameter extending from the face juxtaposed to the spacer 79 for substantially one-half the thickness of the roller with the side walls of the recess projecting from the periphery of the disk. The roller 72' has an annular flange 72ᵇ at one end arranged to overlap the peripherally recessed portion of the roller 72. The portion of the roller 72' inwardly of the flange 75ᵇ is arranged with peripheral recesses shown as the recesses at 72ᶜ of arcuate form in cross section with the separating wall 72ᵈ of the recesses arranged in opposed relation to the recess 72ª in roller 72 and the portion of the closure parts passing between the roller recesses is creased and fluted inwardly of the bend with the crease extending in the direction of the bent portion. The portion of the roller 72' outwardly from the recesses 72ᶜ to the opposite side of the roller is of a diameter substantially equal to that of the separating wall 72ᵈ of the recesses and presses together the closure parts inwardly of the crease.

As the closure parts leave the folding and creasing rollers 72, 72' they travel relative to a folding and guiding device a to fold the bent portion upon the crease to position the same in juxtaposed relation to the closure part inwardly of the crease, as shown in Figure 8, and effected by arranging the folding device a substantially as shown in cross section and inverted position in Figure 10 relative to roller 73'. The folding device is mounted, as at 93, on an angle bracket 93' mounted on a gib plate 76ª. As the closure parts are folded as shown in Figure 8 the creased portion of the outer ply will be expanded so that it will lie smoothly over the inner ply and prevent the exerting of tensile stresses on such part that might crack or rupture the same at the bend in the subsequent pressing of the closure parts into firm and intimate contact. The inner ply of the folded closure parts will be partly expanded and firmly crowded upon itself and into firm contact with the inner surface of the outer ply of the fold thereby assuring a positive uniting and sealing of the closure parts.

From the folding device the closure parts are moved by the travel of the container with the turntable or conveyor relative to the rollers 73, 73' that press the folded closure parts into firm engagement. The roller 73 is arranged with an annular recess 73ª of arcuate form in cross section and extended into the corner at the juncture of the face juxtaposed to the spacer 79 and the periphery of the roller. The rollers 73' has a portion 73ᵇ of reduced diameter and rounded at the juncture thereof with the portion of larger diameter, as at 73ᶜ, arranged in a higher plane than the upper surface of the roller 73 to engage over the bend of the portion outwardly from the rounded corner engaging the closure part within the bend in opposed relation to the roller 73, as clearly shown in Figure 8.

From the rollers 73, 73' the folded closure parts move relative to the member b to guide and press the folded closure parts together during the transporting of the container by the turntable T'. The member b, as shown in inverted position and in section in Figure 11, comprises a member 94 of U-shape in cross section with one leg of greater length than the other leg and whereby it is secured upon a gib plate 76ᵃ, as at 94'. The member 94 is disposed between the pairs of rollers 73, 73' and 74, 74' with the shorter leg spaced from the gib plate and the end of said leg adapted to engage the outer side of the folded portion with the bend of the fold engaging and pressing against an angle of an angle member 94'' secured at one angle portion to and within the member 94 with the other angle portion spaced from and of a length to extend beyond the shorter leg of the member 94.

From the guide member b the closed end of the container moves between the pair of rollers 74, 74' (Figure 9) to firmly press the folded closure parts together to assure intimate contact and uniting of the same. The roller 74 is similar to the roller 73 in that it is provided with an annular recess 74ᵃ, but of less depth than the recess 73ᵃ in roller 73. The roller 74' is similar to the roller 73' in that it is provided with an annular recess 74ᵇ but of less depth than the recess 73ᵇ in roller 73'. From rollers 74, 74' the closure parts of the container travel relative to the guide member c that is substantially the same as the guide member b except that the shorter leg of the U member 94 is slightly increased in length and the member 94'' is spaced a less distance from the shorter leg of the U member 94.

As the closure parts of the container leave the guiding member c they move relative to rollers 75, 75', the roller 75 constituting an impression making wheel as hereinbefore described, and the roller 75' is of uniform diameter and spaced from the impression making wheel 75 a distance to permit of the passage of the closure parts within the bend and cause the impression making wheel to engage therewith with sufficient pressure to make an impression or imprint thereon. From the rollers 75, 75' the closure parts of the container are moved relative to the member d mounted on the bracket B², said member being substantially of the same cross sectional structure as the guiding and pressure applying member c, and adapted to guide and press the closure parts together as they are moved relative to said member. The closure parts of the container as they move from the member d by the transporting of the container by the turntable T' are substantially as shown in Figure 3.

To clear foreign substances from the recesses 72ᵃ and 72ᶜ in rollers 72, 72' that might interfere with the proper creasing or fluting scrapers 72ᵉ and 72ᶠ are provided and mounted in a block 95 fixed on and projecting upwardly from the bracket B². To mount the scrapers on the block 95 each scraper is arranged with and carried by a stem adapted to engage in sockets in the block 95, as shown at 72ᵍ in Figure 12.

The containers after leaving the guiding and pressing member d are transported relative to a deflecting and guiding member 96 (Figures 1 and 5) and thereby directed and caused to be transferred to a shelf 97 disposed in the plane of the turntable T' and extending between the turntable and the conveyer 39, and transferred from the shelf 97 to said conveyer to be transported thereby.

While one embodiment of apparatus to carry out the invention has been illustrated and described it will be obvious that various modifications may be made in the construction and arrangement of the parts without departing from the scope of the invention, and that portions of the invention may be used without others and come within the scope of the invention.

Having described my invention I claim:

1. In apparatus to close and seal the filler opening of containers having a coating of thermoplastic adhesive upon the interior surface thereof, a continuously travelling container transporting conveyer, means travelling in synchronism with and positioned above the conveyer adapted to engage containers transported on the conveyer at opposite sides below the filler end and press said wall portions together to close the filler opening and hold the closure parts in closed condition as the containers are transported by the conveyer, means relative to which the closure parts are moved as the containers are transported by the conveyer to apply heat and pressure to the closure parts to fuse the coating material on and intimately contact the closure parts, means arranged successive to said heat and pressure applying means operative as the heated closure parts are moved relative thereto to fold the closure parts upon themselves, and means arranged successive to said folding means operative as the folded parts are moved relative thereto to apply pressure to the folded closure parts and effect intimate contact between the folded closure parts.

2. In apparatus to close and seal the filler opening of containers having a coating of thermoplastic adhesive material upon the interior surface thereof, a continuous travelling container transporting conveyer, means travelling in synchronism with and positioned above the conveyer adapted to engage containers transported on the conveyer at opposite sides below the filler end and press said wall portions together to close the filler opening and hold the closure parts in closed condition, means relative to which the closure parts are moved to apply heat and pressure thereto to fuse the coating material and intimately contact the closure parts, means relative to which the heated closure parts are moved to crease and offset laterally to one side an intermediate portion of the closure parts and bend the closure parts above the crease laterally to the side to which the creased portion of the closure parts is offset, and means relative to which the creased and laterally bent closure parts are successively moved to fold the laterally bent portion upon the crease into juxtaposed relation to the closure parts below the crease.

3. In apparatus to close and seal the filler opening of containers as claimed in claim 2, means arranged successively to said folding means and relative to which the folded closure parts are moved operative to apply pressure to and imprint indicia upon the folded closure parts.

4. In apparatus to close and seal the filler opening of containers having a coating of thermoplastic adhesive material upon the interior surface thereof, a continuously travelling container transporting conveyer, means superposed to and travelling in synchronism with the conveyer operative to engage containers transported by the conveyer at opposite sides and below the filler end and press said wall portions together to close the filler opening and maintain the filler opening in closed condition for a predetermined travel of the containers with the conveyer, and means superposed to the closing means and relative to which the closure parts of the containers held in closed condition by said means are successively moved as the containers are transported by the conveyer operative in successive sequence to subject the closure parts to heat and pressure to fuse the coating material and intimately contact the closure parts, fold the closure parts upon themselves, and then apply pressure to the folded closure parts to effect intimate contact between and secure the folded closure parts by the coating material and imprint indicia upon the closure parts.

5. In apparatus for closing and sealing the filler opening of containers having a coating of thermoplastic adhesive material on the interior surface thereof, a continuously travelling container transporting conveyer, a pair of members spaced above and travelling in synchronism with the conveyer arranged to travel in contact with each other relative to a predetermined portion of the conveyer travel and adapted to engage containers transported by the conveyer at opposite wall portions below the filler end and press said wall portions together above said members to close the filler opening, and means disposed along the contacting portions of said members and relative to which the closed closure parts of the containers are moved operative to subject the closure parts to heat and pressure to fuse the coating material and intimately press together the closure parts, means arranged successively to the heat and pressure applying means relative to which the closure parts are moved to fold the closure parts upon themselves and apply pressure to and effect intimate contact between the folded closure parts.

6. In apparatus to close and seal the filler opening of containers having a coating of thermoplastic adhesive material upon the interior surface thereof, a continuously rotatable container transporting disk, a second disk of less diameter than and spaced above the container transporting disk a distance less than the height of containers the filler openings of which are adapted to be closed and sealed and rotatable with said container transporting disk, a continuously travelling endless flexible member, means to support and guide said member to cause a stretch thereof to engage and travel in contact with the periphery of said second disk and said flexible member and periphery of the second disk adapted to engage containers transported by the first disk at opposite side wall portions below the filler end and press said wall portions together to close the filler opening and shape the closure parts to conform to the periphery of said second disk, means arranged above the container engaging portions of said flexible member and said disk and relative to which said closure parts are moved operative to apply heat and pressure to the closure parts to fuse the coating material on and intimately contact the closure parts, and means arranged successively to said latter means operative as the closure parts are moved relative thereto to fold the closure parts upon themselves and apply pressure to and effect intimate contact between the closure parts.

7. In apparatus to close and seal the filler opening of containers having a coating of thermoplastic adhesive material upon the interior surface thereof, a continuously rotatable container transporting disk, a second disk of less diameter than the first disk supported in predetermined superposed relation to and rotatable with the first disk, an endless belt, means to drive said belt in synchronism with the first disk, means to guide the belt to cause a stretch of the belt to engage and travel in contact with the periphery of the second disk, said container transporting disk by the rotation thereof adapted to position containers transported thereby in the bight of said belt and second disk to be engaged thereby at opposite side wall portions below the filler end and press said wall portions together to close the filler opening and shape the closed closure parts to arcuate form conformable to the periphery of the second disk, and a plurality of means arranged in successive order above the engaging portion of the belt and second disk relative to which the closed closure parts of containers are adapted to be moved by the rotation of the container transporting disk, the first of said means being operative to subject the closure parts to heat and pressure to fuse the coating material on and intimately contact the closure parts, the successive means being operative to fold said heated closure parts upon themselves, and the successive means being operative to apply pressure to the folded closure parts during the cooling of the fused coating material on the closure parts to effect intimate contact between and adhesively secure the folded closure parts.

8. In apparatus to close and seal the filler opening of containers having a coating of thermoplastic adhesive material upon the interior surface thereof, a continuously rotating container transporting disk, a second disk of less diameter than the first disk supported in superposed relation to and rotatable with the first disk, an endless belt, means to drive said belt in synchronism with the first disk, means to guide the belt to cause a stretch thereof to travel in contact with the periphery of the second disk, said belt and second disk adapted to engage therebetween a container at opposite side wall portions below the filler end transported by the first disk and press said wall portions together to close the filler opening and shape the closure parts to conform to the periphery of the second disk, means disposed above the engaging portions of the belt and second disk relative to which the closure parts are moved operative to apply heat and pressure to the closure parts while held in closed condition between the belt and said disk to fuse the coating material on and press the closure parts into intimate contact, means arranged successively to the heat and pressure applying means operative to fold said closure parts upon themselves, means arranged successively to said folding means operative to apply pressure to the folded closure parts, a second means arranged successive to said means to apply pressure to the folded closure parts operative to subject the folded closure parts to a compression pressure, and means to hold the folded closure parts in folded condition and guide the same from said first pressure applying means to the compression pressure applying means.

9. In apparatus to close and seal the filler opening of containers having a surface coating of thermoplastic adhesive material, a continuously travelling container transporting conveyer, means travelling in synchronism with the conveyer operative during the transporting of containers by the conveyer to progressively engage opposite wall portions of the containers below the filler end and press together said wall portions to close the filler opening and retain the filler opening closed as the containers are transported by the conveyer, and means spaced successively along said means relative to which the closure parts are moved by the travel of the conveyer to apply heat and pressure to the closure parts to fuse the coating material and intimately contact the closure parts, fold the heated closure parts upon themselves, and apply pressure to and secure the closure parts in closed condition by the coating material.

10. In apparatus to close and seal the filler opening of containers having a coating of thermoplastic material upon the interior surface thereof, a continuously rotating container transporting disk, a second disk of less diameter than the first disk supported in predetermined superposed relation to and rotatable with the first disk, an endless belt travelling in synchronism with said second disk and one stretch engaging the periphery of the disk, and a portion below the filler end of containers transported by the first disk adapted to be engaged between the belt and the periphery of the second disk and thereby press together and close the filler opening and shape the closure parts to arcuate form to conform to the periphery of the second disk and maintain the closure parts in closed condition for the length of travel of the belt in engagement with the disk, means disposed along and relative to which the closure parts held in closed condition by the engaging portions of the belt and disk are moved to apply heat and pressure to the closure parts to fuse the coating material and intimately contact the closure parts, means arranged successively to the heat and pressure applying means and each other operative as the closure parts are moved relative thereto to crease the intermediate portion of the closure parts and bend the closure parts on the crease to extend laterally toward the concave side of the closure parts, fold the bent closure parts upon the crease into contiguous relation to the portion of the closure parts below the crease and then apply pressure to the folded closure parts to effect intimate contact between said parts, and means relative to which the folded closure parts are moved to retain the closure parts in folded condition and guide the same to the pressure applying means.

11. The method of closing and sealing the filler opening of containers of flexible fibrous material having a coating of thermoplastic adhesive material on the interior surface thereof including a body having a bottom closure secured in one end and the other end constituting the filler opening, which comprises in successive sequence closing the filler opening by engaging the container body at opposite sides below the filler end and pressing together opposite wall portions at the filler end and simultaneously arranging the closure parts to arcuate form in a direction transversely of the container and securing the closure parts in pressed together arcuate form with the coating material by the application of heat and pressure.

12. The method of closing and sealing the filler opening of containers of flexible fibrous material having a coating of thermoplastic adhesive material upon the interior surface thereof including a body having a bottom closure secured in one end and the opposite end constituting the filler opening, which comprises continuously transporting the containers in upright position, closing the filler opening by engaging the container body at opposite sides below the filler end and pressing together opposite wall portions at the filler end and simultaneously arranging the closure parts to arcuate form in a direction transversely of the container, then while holding the container in said condition subjecting the closure parts to heat and pressure to fuse the thermoplastic on and intimately contact the closure parts, creasing the intermediate portion of the closure parts and offsetting the material of the crease toward the concave side of the closure parts, and then folding the closure parts upon the crease in a direction toward the concave side of the closure parts and effecting intimate contact between the folded closure parts by the application of pressure to the folded closure parts during the cooling of the thermoplastic adhesive.

13. In the method of closing and sealing the filler opening of containers as claimed in claim 12, imprinting indicia on the closure parts while applying pressure to the closure parts to effect intimate contact between the closure parts.

14. The method of closing and sealing the filler opening of containers of flexible fibrous material having a coating of thermoplastic adhesive material upon the interior surface thereof including a body having a bottom closure secured in one end and the opposite end constituting the filler opening, which comprises continuously transporting containers in upright position at the bottom, flattening the filler end of the container and arranging the same to arcuate form in a direction transversely of the container by pressure applied to opposite sides of the container within the filler end, and in successive sequence while holding the filler end in arcuate closed condition fusing the coating material on and intimately contacting the closure parts by the application of heat and pressure, longitudinally creasing the intermediate portion of the closure parts and offsetting the material of the crease toward the concave side of the closure parts, folding the closure parts on the crease in a direction toward the concave side of the closure parts and expanding the material of the crease of the outer ply about and crowding the material of the inner ply within the fold of the outer ply, and then effecting intimate contact between the folded closure parts by subjecting th' same to progressively increased pressures.

15. Apparatus for closing and sealing the filler opening of containers as claimed in claim 10, wherein the means to crease and bend the closure parts laterally on the crease comprises a pair of rollers, one roller having a peripheral recess and the other roller having a peripheral flange at one end and juxtaposed peripheral recesses below the flange, and said roller arranged with a peripheral portion of the flange overlapping an end portion of the first roller and with the separating wall of the peripheral recesses opposed to the peripheral recess in said first roller, means to mount one of said rollers to have movement toward and away from the other roller, and adjustable means to limit the movement of said movably mounted roller in a direction toward the other roller.

16. In apparatus for closing and sealing the filler opening of containers having a coating of thermoplastic material on the interior surface thereof, a continuously traveling container supporting conveyor, a pair of members spaced above and travelling in synchronism with the conveyor arranged to travel in engagement with each other for a predetermined length of travel of the conveyor, and said members adapted to engage opposite wall portions of containers on the conveyor below the filler end and press together the wall portions of the containers above the portions engaged by said members to close the filler opening, heating means relative to which one side of the closure parts of the container engaged by said members is moved to fuse the coating material on the closure parts, shoes arranged successively at the side of the closure parts opposite the heating means and yieldingly urged toward the same and adapted to successively engage and subject the closure parts to pressure, and means arranged successively to said heating means and pressure applying shoes relative to which the closure parts are moved operative to fold the closure parts upon themselves and subject the folded closure parts to successively increased pressure to effect intimate contact between the same during the cooling of the coating material.

17. Apparatus to close and seal the filler opening of containers as claimed in claim 8, wherein the means to apply heat and pressure to the closed closure parts comprises a member having an arcuate face extending coincidental with a portion of the periphery of the second disk, a series of shoes arranged successively in opposed relation to the arcuate face of said member and yieldingly urged toward said face and the closed closure parts of the container moved between said shoes and arcuate face as the container is transported by the first disk, and means to heat the shoes and said member.

18. Apparatus to close and seal the filler opening of containers as claimed in claim 8, wherein the means to apply heat and pressure to the closed closure parts comprises a housing having an arcuate wall the convex face of which wall is arranged in an arc extending coincidental with the periphery of the second disk, a series of shoes successively arranged in said housing in opposed relation to the convex face of said wall and between which face and the shoes the closure parts are moved as the container is transported by the first disk, means to position and permit the shoes to have rocking movement relative to and toward and movement away from said convex face, means to urge the shoes to the convex face of said member and normally position the shoes with the following portion of the face of the shoes into engagement and the leading portion thereof out of engagement with said face and means to heat the shoes and said arcuate wall of the housing.

19. Apparatus to close and seal the filler opening of containers as claimed in claim 8, wherein the means to apply heat and pressure to the closed closure parts comprises a member having a convex face extending coincidental to the periphery of the second disk, a series of shoes arranged successively in opposed relation to and urged toward said convex face and between which convex face and the shoes the closure parts are moved as the container is transported by the first disk, an electric heating element to heat said member and shoes, and means to control and regulate the temperature of heating element including a temperature responsive member disposed relative to said member with the convex face.

20. Apparatus to close and seal the filler opening of containers as claimed in claim 10, wherein the means to crease and bend the closure parts laterally comprises a pair of rollers, one roller having a peripheral recess, and the other roller having a peripheral flange at one end and juxtaposed annular peripheral recesses inwardly of the flange, and said latter roller arranged with a peripheral portion of the flange overlapping an end of the first roller and the separating wall of the recesses opposed to the recess in the first roller, and one roller mounted to have adjustment toward and away from and yieldingly urged toward the other roller, and means to rotate said rollers in synchronism with the conveyor transporting disk.

21. Apparatus to close and seal the filler opening of containers as claimed in claim 10, wherein the means to fold the bent portion upon the crease of the closure parts into juxtaposed relation to the closure part below the crease, comprises a folding and guiding member relative to which the closure parts are moved from the creasing and bending means.

22. Apparatus to close and seal the filler opening of containers as claimed in claim 10, wherein the means to apply pressure to the folded closure parts comprises pairs of opposed rollers arranged successively to the folding member between which the folded closure parts are moved, and the rollers of each pair of rollers having peripheral recesses arranged to form a passage between the opposed peripheral portions of the rollers shaped to conform to the cross sectional shape of the folded closure parts, and one roller of each pair of rollers mounted to have movement toward and away from and yieldingly urged toward the other roller, and said rollers rotated in synchronism with the travel of the container.

23. Apparatus to close and seal the filler opening of containers as claimed in claim 10, wherein the means to retain the closure parts in folded condition as the closure parts are moved to the pressure applying means is arranged with a part to engage the folded closure parts at the fold and inwardly of the fold.

24. In apparatus to close and seal the filler opening of containers as claimed in claim 5, means arranged successively of the means to apply pressure to the folded closure parts and relative to which the folded closure parts are moved to place the closure parts within the fold under pressure and imprint indicia on the closure parts during the transporting of the container by the conveyor.

25. The method of closing and sealing the filler opening of containers of flexible fibrous material having a coating of thermoplastic adhesive material on the inner surface and including a body having a bottom closure secured in one end and the opposite end constituting the filler opening, which comprises continuously transporting containers in upright position, closing the filler opening by engaging the body at opposite sides below the filler end and pressing together opposite side wall portions at the filler opening, then while holding the containers in said condition in successive sequence subjecting the closure parts to heat and pressure to fuse the thermoplastic adhesive and intimately contact the closure parts, creasing the intermediate portion of the closure parts, folding the closure parts upon the crease, and then subjecting the folded closure parts to pressure and crowding the material of the inner ply of the fold within the material of the outer ply of the folded portion to effect intimate contact between the closure parts and secure the closure parts in said condition by the thermoplastic adhesive.

ALFRED MERKLE.